United States Patent [19]

Will et al.

[11] 4,146,571

[45] Mar. 27, 1979

[54] PREPARATION OF SODIUM PERCARBONATE

[75] Inventors: Ernst Will; Gunther Bierbaumer, both of Treibach, Austria

[73] Assignee: Treibacher Chemische Werke, Treibach, Austria

[21] Appl. No.: 845,378

[22] Filed: Oct. 25, 1977

[30] Foreign Application Priority Data

Oct. 22, 1976 [AT] Austria ................................ 7909/76

[51] Int. Cl.[2] .............................................. C01B 15/10

[52] U.S. Cl. ................................................ 423/415 P

[58] Field of Search ............................ 423/415, 415 P

[56] References Cited

FOREIGN PATENT DOCUMENTS 549841 12/1942 United Kingdom ................ 423/415 P 568754 4/1945 United Kingdom ................ 423/415 P

*Primary Examiner*—Earl C. Thomas

*Attorney, Agent, or Firm*—Kurt Kelman

[57] ABSTRACT

Sodium percarbonate is prepared from a reaction mixture of an $Mg^{++}$ containing hydrogen peroxide solution, sodium hexametaphosphate and an aqueous sodium carbonate suspension containing sodium chloride and/or sodium sulfate, wherein the initial reaction mixture contains only 3–50%, by weight, of the soda suspension while the remainder of the reactants are added subsequently. The mixture is continuously stirred until the level of peroxide remains constant, and the crystalline percarbonate is then separated.

4 Claims, No Drawings

PREPARATION OF SODIUM PERCARBONATE

The present invention relates to improvements in the preparation of sodium percarbonate.

Sodium percarbonate has attained increasing importance as an additive to washing liquids to produce active oxygen in the wash water.

Various processes have been proposed for preparing sodium percarbonate from a reaction mixture of sodium carbonate (soda) and hydrogen peroxide. The dry processes all have the disadvantage that the impurities in the soda reactant negatively affect the stability of the percarbonate reaction product. It has been impossible to obtain with these processes a free-flowing and abrasion-resistant product of a desired particle size range in a simple manner.

Various wet processes for preparing sodium percarbonate have also been proposed but they have the disadvantages cited hereinbelow. Thus, British Pat. No. 568,754 discloses a process wherein sodium metaphosphate, sodium silicate, solid soda and hydrogen peroxide are added to a mother liquor derived from a previous reaction. This process produces a reaction product with such a large amount of fines that it cannot be used in most practical operations. Furthermore, the stability of the product is low.

According to British Pat. No. 549,841, sodium percarbonate is produced by reacting sodium silicate or a magnesium salt in the presence of an alkali metaphosphate or an alkali pyrophosphate to obtain soda decahydrate crystals or a suspension of the decahydrate in a saturated soda solution in a reaction with a hydrogen peroxide solution. The solubility of the percarbonate is reduced by the subsequent addition of sodium chloride. This product, however, also has an unsatisfactory grain size distribution curve, i.e. it contains too large an amount of fines which must be removed or agglomerated in a subsequent step to obtain sodium percarbonate of practical usefulness.

Some improvement in these wet processes has been attained by the method disclosed in German Published Application (Offenlegungsschrift) No. 2,328,803. Sodium percarbonate is prepared by reacting a sodium carbonate solution or suspension containing sodium hexametaphosphate or sodium polyacrylate with an $Mg^{++}$ containing hydrogen peroxide solution in the presence of sodium chloride. The reaction product has good abrasion resistance but contains too many fines. The working examples show that about one fourth of the product contains grains of a size smaller than 0.25 mm, i.e. the yields in useful product are relatively small.

It is the object of this invention to improve the preparation of sodium percarbonate so as to obtain a product with a favorable grain size distribution useful in wash media also with respect to its mechanical consistency.

This and other objects are accomplished in accordance with the invention by initially providing only from 3% to 50%, by weight, of the soda suspension of a reaction mixture of reactants comprising an $Mg^{++}$ containing hydrogen peroxide solution, sodium hexametaphosphate and an aqueous sodium carbonate suspension containing at least one sodium salt selected from the group consisting of sodium sulfate and sodium chloride, incorporating the remainder of the reactants by continuously adding and stirring the reactants including the peroxide solution, the hexametaphosphate and the sodium carbonate suspension, continuing stirring of the reaction mixture after the remainder of the reactants have been added until the level of dissolved hydrogen peroxide in the mixture remains constant,and separating a crystalline reaction product consisting of sodium percarbonate. The initial reaction mixture preferably contains from about 5% to 20%, by weight, of the sodium carbonate suspension. The crystalline reaction product is separated by filtration and the filtrate may be used to prepare the sodium carbonate suspension for a subsequent preparation of sodium percarbonate.

It was unexpected to find a substantial improvement in the reaction product by modifying the process of preparation so that a soda suspension and $Mg^{++}$ containing $H_2O_2$-solution were added simultaneously to a previously prepared sodium percarbonate suspension. Microscopic investigations have shown that the sodium percarbonate product prepared by the process of the present invention consists of spherolithic crystals.

The process of this invention provides a very economical preparation of sodium percarbonate because there is no need for the added elimination of fines, agglomeration of the fines into grains of practically acceptable size or recycling thereof to the crystallization reaction. Furthermore, the process is exceedingly simple and requires merely a cooled vessel with a stirrer. The reaction product is preferably separated from the mother liquor in a centrifuge and the separated product is then dried in any suitable manner well known in the art.

Another advantage of this process resides in its selectivity since the grain size distribution may be readily influenced to adapt it to various requirements of the end product simply by changing the percentage of the initial reaction mixture to which the reactants are then added. Depending on this percentage, the end product may contain practically no fines (defined as grains having a size of less than 0.25 mm). In addition, the products prepared by the process have high mechanical resistance and are ideally suited for transportation, storage and use in wash media.

The process of the invention makes optimum use of the hydrogen peroxide reactant since it is possible to recycle the mother liquor after the sodium percarbonate crystals have been separated therefrom, the soda required for the precipitation being suspended in this liquor, and the liquor being purified, if needed, and cooled before it is used again. The losses on active oxygen are thus reduced to a minimum and are below 10% if the total process is considered.

If desired, such known stabilizers as organic complexing agents, waterglass or magnesium silicate may be added to the reaction mixture.

It is necessary to add sodium chloride or sodium sulfate to the aqueous sodium carbonate solution to reduce the solubility of the sodium percarbonate product and to provide optimum crystallization conditions. Furthermore, it is advantageous to precipitate the sodium percarbonate from the reaction mixture in such a manner that an excess of soda remains in the mixture after the raction has been completed since this will further reduce the solubility of the product.

The addition of the crystallization reactants to the initial reaction mixture proceeds in the following manner:

Magnesium sulfate or chloride ($Mg^{++}$) is dissolved in an $H_2O_2$-solution in an amount providing preferably 0.2 to 2%, preferably 0.3 to 0.6%, by weight, based on the weight of the peroxide, of magnesium ions.

The sodium hexametaphosphate reactant may be added by dissolving it in the concentrated soda solution but this involves the possibility of hydrolytic decomposition reactions. Therefore, it is advantageous to add this reactant during the crystallization reaction batchwise or continuously in the required quantity. An amount of 0.5% to 3%, by weight, based on the weight of the resultant sodium percarbonate, of the hexametaphosphate has proved adequate, a minimum amount of 1.5% being preferred and more than 3% rarely being needed.

The hydrogen peroxide is added preferably in concentrated form, a 50% to 80% concentration in the aqueous solution being useful. This will avoid heavy dilution by water.

In industrial operations, a percentage of the aqueous soda suspension commensurate with the desired grain size distribution is placed into the reaction vessel initially. This reaction component may be prepared by suspending soda in a mother liquor coming from a previous reaction cycle and containing residual amounts of hydrogen peroxide. Depending on the desired grain distribution of the reaction product, from 3–50%, preferably from 5–20%, by weight, of the total soda suspension used in the crystallization reaction is initially provided in the reaction vessel. The lower and upper limits of this range may be exceeded under certain circumstances.

The preferred reaction temperature ranges from about 15° C. to 30° C. The sodium hexametaphosphate reactant is then added to the initial reactant, followed by the addition of an $Mg^{++}$ containing $H_2O_2$-solution. After these additions, preferably under constant stirring, the remainder of the reactants are added within five to thirty minutes. The crystallization process is completed when the portion of $H_2O_2$ in the solution has been reduced to a constant level, which often takes about an hour after the reactants have been added and stirred into the reaction mixture.

The simultaneous initial placing of a soda suspension and $H_2O_2$-solution in the reaction vessel, i.e. the use of a recycled mother liquor, sometimes creates operating difficulties because the mixture is difficult to stir so that there are local super concentrations of peroxide. However, the resultant product has a good grain size distribution.

After the reaction product has been separated from the mother liquor, the latter may be recycled and soda may be added thereto to provide another initial reaction charge. When soda is added to the recycled mother liquor, the temperature should not exceed about 40° C. to avoid decomposition of the residual peroxide contained therein. It is also advantageous to purify the mother liquor and to cool it to a temperature of about 15° C. to 30° C. while it is stirred before using it again for a crystallization reaction. When the mother liquor is cooled to this temperature range, a certain amount of soda decahydrate is precipitated, the amount depending on the soda concentration, which reacts with the hydrogen peroxide in the subsequent crystallization reaction.

The process will be explained in detail in connection with the following working examples:

EXAMPLE 1

Forty liters of an aqueous soda suspension containing 250 g/l of sodium carbonate ($Na_2CO_3$), 180 g/l of sodium chloride (NaCl) and 2.2 g/l of sodium hexametaphosphate were placed into a vessel having a capacity of 100 liters and being provided with a stirrer. The temperature of the suspension in the reaction vessel was 20° C. Within two minutes, 4.65 kg of a 70% hydrogen peroxide ($H_2O_2$) solution containing 50 g of $MgSO_4.7H_2O$/l dissolved therein was added thereto under constant stirring. Within another ten minutes, there were continually added 40 liters of a soda suspension (250 g/l of $Na_2CO_3$ and 180 g/l of NaCl) and 4.65 kg of the above-indicated $Mg^{++}$ containing hydrogen peroxide solution, as well as 88 g of the hexametaphosphate. The reaction mixture was stirred for 75 minutes and a sodium percarbonate reaction product formed in the reaction was then removed by filtering and dried. The reaction yielded 17.5 kg of sodium percarbonate with a 14.1% active oxygen content. The grain distribution in the reaction product was as follows: 53% of the grains had dimensions between 0.5 and 0.25 mm and 47% had dimensions smaller than 0.25 mm.

EXAMPLE 2

The procedure of Example 1 was modified by placing into the reaction vessel only 20 l of the soda suspension and reacting it with 2.3 kg of the hydrogen peroxide solution. Within 10 minutes 60 l of the soda suspension, 7 kg of the peroxide solution and 132 g of the hexametaphosphate were continuously added. After 75 minutes of stirring, the same amount of sodium percarbonate was obtained, with the following grain distribution: 74% of the grains had a size of 0.5 to 0.25 mm while 26% had a smaller size.

EXAMPLE 3

Ten liters of the aqueous soda suspension of Example 1 were placed into the reaction vessel and reacted with 1.16 kg of the $Mg^{++}$ containing hydrogen peroxide solution of Example 1. In the same manner as in the preceding examples, 70 l of the soda suspension, 8.14 kg of the $Mg^{++}$ containing peroxide solution and 154 g of the hexametaphosphate were then added. The grain distribution of the resultant reaction product was as follows: 32% of the grains had a size larger than 0.5 mm, 66% had a size between 0.5 and 0.25 mm, and 2% had a smaller size.

The same results were obtained when the soda suspension was recycled several times in successive reactions.

By way of comparison, the following example shows an undesirable grain distribution in the reaction product, i.e. too many coarse or fine particles, if the amount of the soda suspension reaction component is outside the range of 3% to 50%, by weight:

The total amount of 80 l of the soda suspension and 176 g of the hexametaphosphate was reacted within 15 minutes with 9.3 kg of the $Mg^{++}$ containing peroxide solution, the reaction mixture was stirred for 75 minutes, the reaction product was filtered and dried. The grain distribution was 39% 0.5–25 mm and 61% smaller than 0.25 mm.

What is claimed is:

1. In a process of preparing sodium percarbonate by reacting respective predetermined amounts of sodium carbonate and hydrogen peroxide with each other in an aqueous medium containing magnesium ions and sodium hexametaphosphate in amounts effective for stabilizing said hydrogen peroxide and said sodium percarbonate, and a sodium salt selected from the group consisting of sodium chloride and sodium sulfate in a concentration sufficient to make said sodium carbonate and said sodium percarbonate partly insoluble in said medium, the improvement which comprises:

a. preparing a suspension of a first portion of said sodium carbonate in water containing said sodium salt in said sufficient concentration;
b. mixing said suspension with an aqueous solution of a first portion of said hydrogen peroxide in the presence of said effective amounts of said sodium hexametaphosphate and said magnesium ions until a suspension of sodium percarbonate is formed, said first portions being 3% to 50% by weight of the respective predetermined amounts of said sodium carbonate and of said hydrogen peroxide;
c. simultaneously adding with stirring to said suspension of sodium percarbonate an aqueous suspension of the remainder of said predetermined amount of sodium carbonate and an aqueous solution of the remainder of said predetermined amount of hydrogen peroxide over a period of 5–30 minutes while maintaining in the resulting liquid mixture said effective amounts of magnesium ions and sodium hexametaphosphate, and said sufficient concentration of said sodium salt, whereby additional sodium percarbonate is precipitated from said mixture;
d. containing said stirring after said adding is completed until the concentration of hydrogen peroxide in said liquid mixture remains substantially constant; and
e. separating precipitated, solid sodium percarbonate from said liquid mixture.

2. In a process as set forth in claim 1, said first portions being 5% to 20% by weight of said respective predetermined amounts.

3. In a process as set forth in claim 2, said suspension of said first portion of said sodium carbonate and said aqueous suspension of the remainder of said predetermined amount of sodium carbonate containing 100 g to 350 g per liter sodium carbonate.

4. In a process as set forth in claim 2, said aqueous solution of said first portion of said hydrogen peroxide and said aqueous solution of said remainder of said hydrogen peroxide containing each 30% to 80%, by weight, of hydrogen peroxide and magnesium ions in an amount of 0.2% to 2% based on the weight of said hydrogen peroxide.

* * * * *